Oct. 30, 1923.

H. L. DOHERTY 1,472,116

PROCESS OF DISTILLING OIL

Filed Jan. 12, 1918

Witness
Chas. L. Griestauer.

Inventor
Henry L. Doherty,
By K. P. McElroy
his Attorney

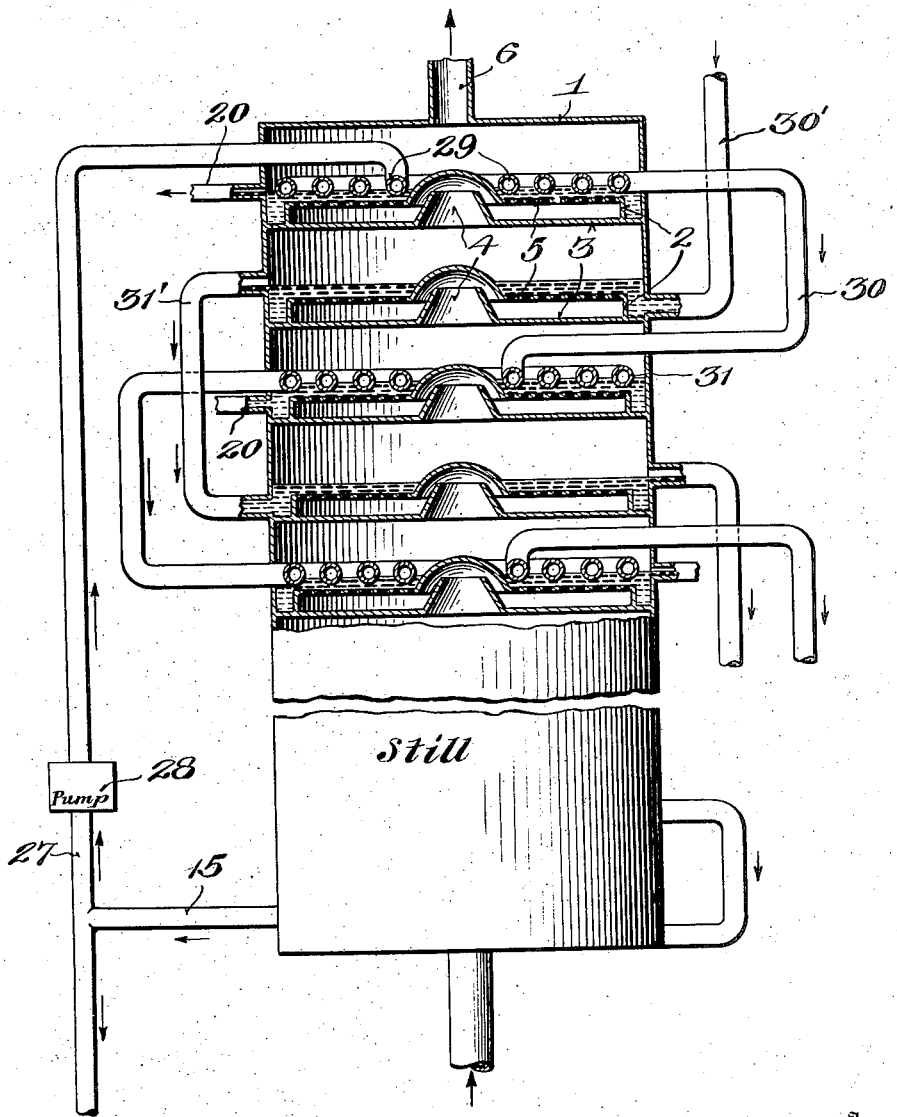

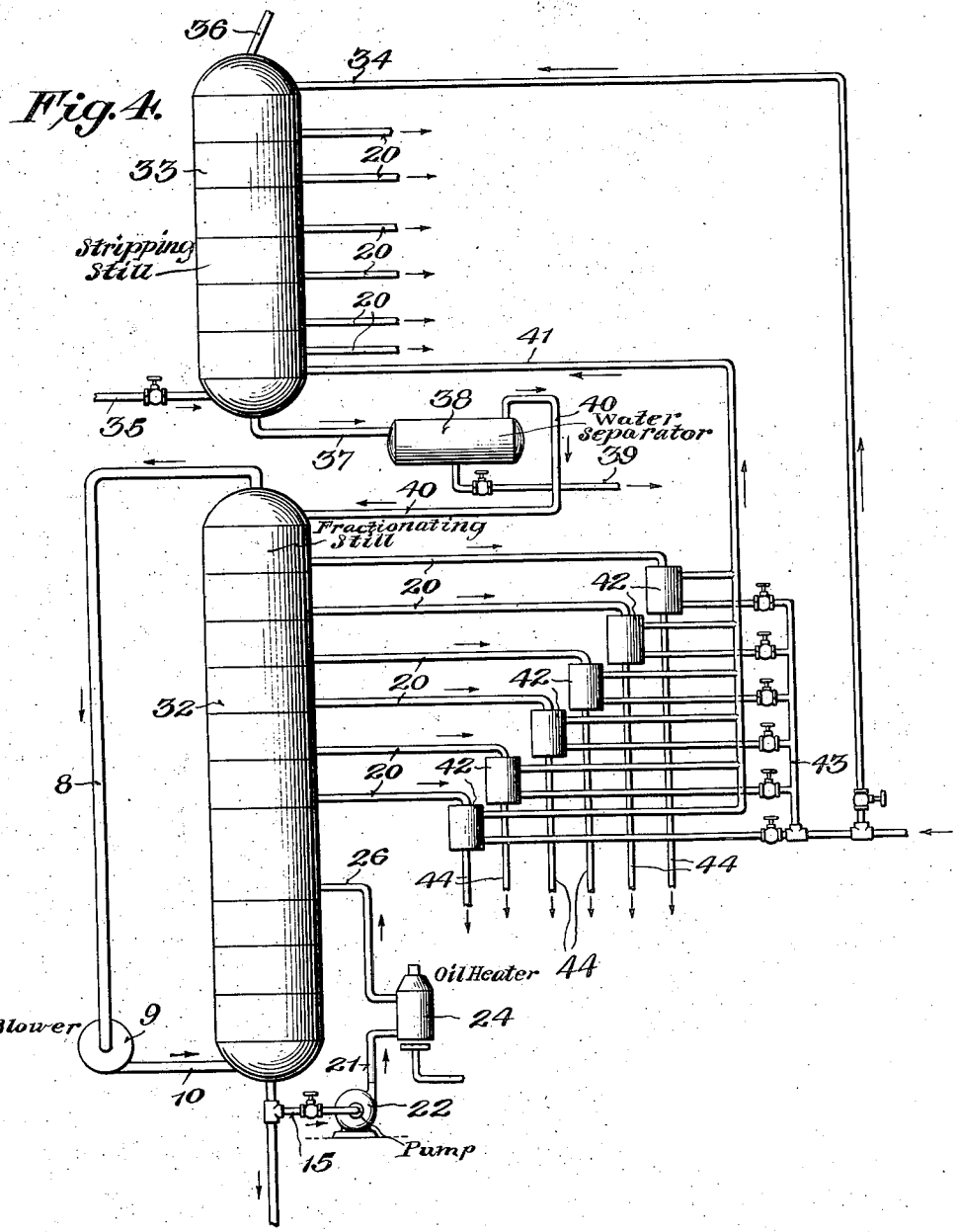

Oct. 30, 1923.
H. L. DOHERTY
PROCESS OF DISTILLING OIL
Filed Jan. 12, 1918
1,472,116
5 Sheets-Sheet 5
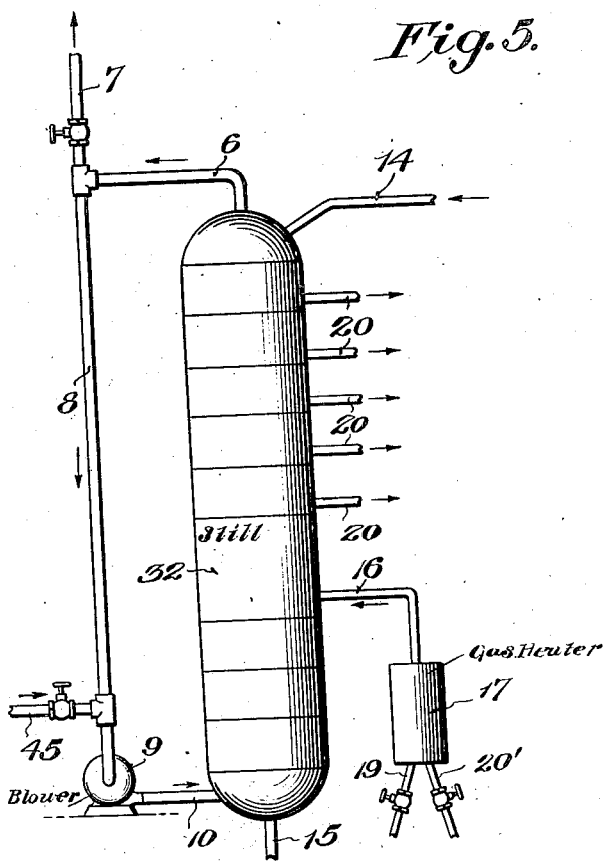
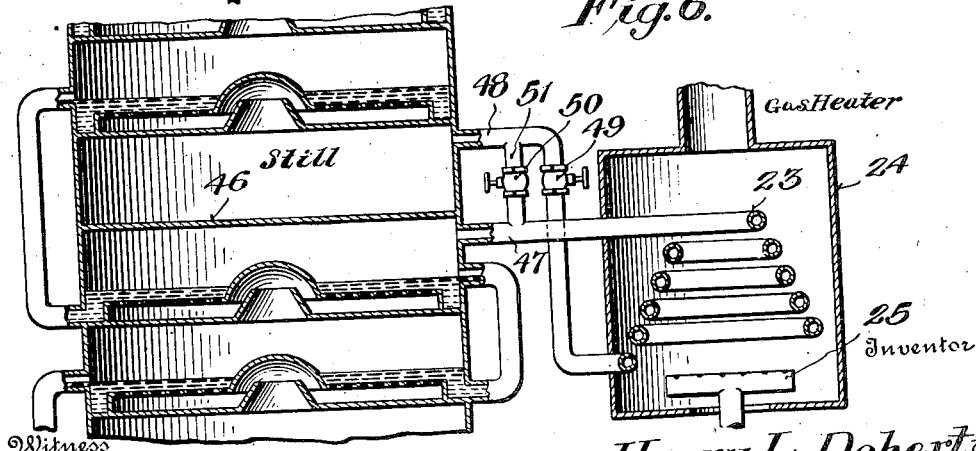
Henry L. Doherty, Patented Oct. 30, 1923.

1,472,116

UNITED STATES PATENT OFFICE.

HENRY L. DOHERTY, OF NEW YORK, N. Y.

PROCESS OF DISTILLING OIL.

Application filed January 12, 1918. Serial No. 211,537.

*To all whom it may concern:*

Be it known that I, HENRY L. DOHERTY, a citizen of the United States, residing at New York, in the county of New York and State of New York, have invented certain new and useful Improvements in Processes of Distilling Oil, of which the following is a specification.

This invention relates to processes of distilling oil; and it comprises a method of distilling petroleum oils, such as crude petroleum, wherein petroleum is distilled in a plurality of stages at different temperatures, the vapors from each succeeding stage being caused, prior to their collection as condensate, to impart their heat to the oil in the next preceding stage; and it comprises as an advantageous embodiment of such method a process wherein a gaseous heat-carrier is used as an assistant in distillation to aid in volatilizing the fractions desired; and it further comprises such a method of distillation wherein the temperatures are carried high enough to secure more or less cracking of the oil in addition to what may be termed the natural distillation of the oil; all as more fully hereinafter set forth and as claimed.

Petroleum is composed of myriads of different hydrocarbons of different boiling points and volatilities, though otherwise similar in properties. There being so many of these hydrocarbons present it naturally follows that the percentage of each is small; and therefore it has proved practically impossible to isolate any of them on the large scale. Instead, the petroleum is divided into rough fractions or cuts as they are technically called; the condensate being diverted from one receiver into another as the temperature of the vapors coming from the still rises and the specific gravity of the condensate increases. Each of these cuts is a highly complex mixture; it is not a simple substance. Every succeeding cut is however substantially free of oils boiling at lower temperatures than that at which it is produced though the converse is by no means true since the vapors of low boiling oils carry over with them vapors of high boiling oils; and in general a redistillation of the oils of any cut will yield oils boiling at a higher temperature than that at which the cut was made. The character of the cuts which shall be made from any given crude oil varies with the ideas of the man in charge of the distillation; and there is no necessary likeness in the products turned out by various refineries from the same oil. Nevertheless a number of these cuts have acquired a commercial character and commercial names. Gasoline, for example, is a cut which contains sufficient readily volatile or low boiling oils to enable its ready ignition with the carbureters of the ordinary gasoline engine; but for some years the composition of the commercial article has been varying in keeping with the improvement in engines. Progressive improvement in this respect has permitted the use of distillates containing progressively larger proportions of heavy oils and less proportions of light and volatile oils. At present gasoline may be defined as a condensate of the vapors which come over from oil at a temperature below 300° F. or below 350° F. (according to the practice of the particular refinery). On redistillation however it gives a large percentage of oils boiling at higher temperatures. As to how many cuts, in addition to gasoline, shall be made from any given oil, this is a matter of option with the refiner and varies from refinery to refinery; but in no case are very many made. And, as pointed out, they are not of uniform character.

In distillation many methods are in use; but in a way it may be said that the oil is usually first distilled by fire heat until gasoline and burning oils are removed, and at the time when the last water white burning oil is over, steam is blown into the still and distillation continued. The reason for the use of steam is that at temperatures above somewhere around 600° F., which is attained when the burning oils are over, the oils begin to decompose or crack. Steam prevents this cracking to a large extent. Sometimes cracking is allowed to take place and indeed it is very often sought. The higher boiling hydrocarbons are invariably more complex in their molecular character than the lower boiling; and under heat these complex molecules break down into simpler or, in other words, heating a high boiling oil gives lower boiling oils. There are accordingly many processes in use for increasing the yield of gasoline by superheating higher boiling oils, either in liquid form or in the vapor form. Gasoline and kerosene so made may be termed cracked products to distinguish them from the refinery or natural gasoline and kerosene.

In making these cracked products however as a rule the distillation to recover the various cuts or products is as simple as that just described, and the products as complex.

Distillation as commonly practiced is as crude as the products made; there being little or no effort made towards any economy of heat or steam. Where oil firing is used, as it usually is, the ratio of oil consumed for purely heating purposes to the oil distilled is large.

In the present invention I have devised a method of distilling petroleum, or its various products, in such a manner as to economize heat and give a relatively great volume of distilled products with a relatively small consumption of fuel and to give definite cuts or fractions which are much closer or smaller in volume than those usually made, the various cuts or fractions being made within ranges of 20 to 50° F. in lieu of the usual hundred or more Fahrenheit degree extremes. By making these fractions which I may here call close fractions, I am enabled by intermingling them to make any commercial grade or cut of oil and at the same time to produce such commercial grades of a much closer range of boiling points than is now customary. In other words, by properly blending certain of these small cuts I can make compositions corresponding to the large cuts of ordinary distillation but each of these compositions in and of itself will be of much more uniform composition than the usual large cuts.

In this process instead of simply boiling a body of oil in a still at a progressively increasing temperature and cooling the vapors by air and water to get rid of the heat imparted to them in the still, I distil in a number of successive bodies of liquid taking the vapors from each succeeding body, which is hotter than the next preceding, and condensing them with the aid of such next preceding body. And instead of using steam simply blown into the still and then condensed with the vapors, I employ a body of carrier gas moving through the distilling system in a methodical way. This carrier gas may take into the system all the heat which is required for distillation. And in an advantageous embodiment of the present invention I distil with the aid of a carrier gas in a methodical way, heat being furnished to the system (that is the center of the system as regards the progress of the oil) and the carrier gas being caused to travel in a closed circuit. By so doing the carrier gas goes through the hot oil coming from the center of the system and abstracts its heat for return to the system. Leaving the center of the system the carrier gas goes against the oil advancing to the center of the system and progressively imparts heat to it, leaving the feed end of the system in a cooled condition. This cooled gas may return to the other end of the system to take up the heat of the residual oil leaving the distilling zone proper. The methods stated may be used in either natural distillation of oils as described or in cracking distillation. When used in cracking distillation, I may or may not use pressure to facilitate the cracking and retain oils in the liquid form against the vaporizing tendency of the high temperature.

In the accompanying illustrations, I have shown, more or less diagrammatically, certain embodiments of apparatus, capable of use in the described processes. In this showing, Fig. 1 is a central vertical fragmentary section of such apparatus, partly in elevation;

Fig. 3 is a fragmentary central vertical section, partly in elevation, of another type of apparatus illustrating the use of a special cooling fluid for condensation;

Fig. 4 is a diagrammatical view in elevation showing a complete apparatus for distilling petroleum oil employing the principles of the present invention;

Fig. 5 is an elevation of a modification particularly adapted for cracking purposes; and Fig. 6 is a segmental vertical section illustrating a modification of the process.

Figure 1:
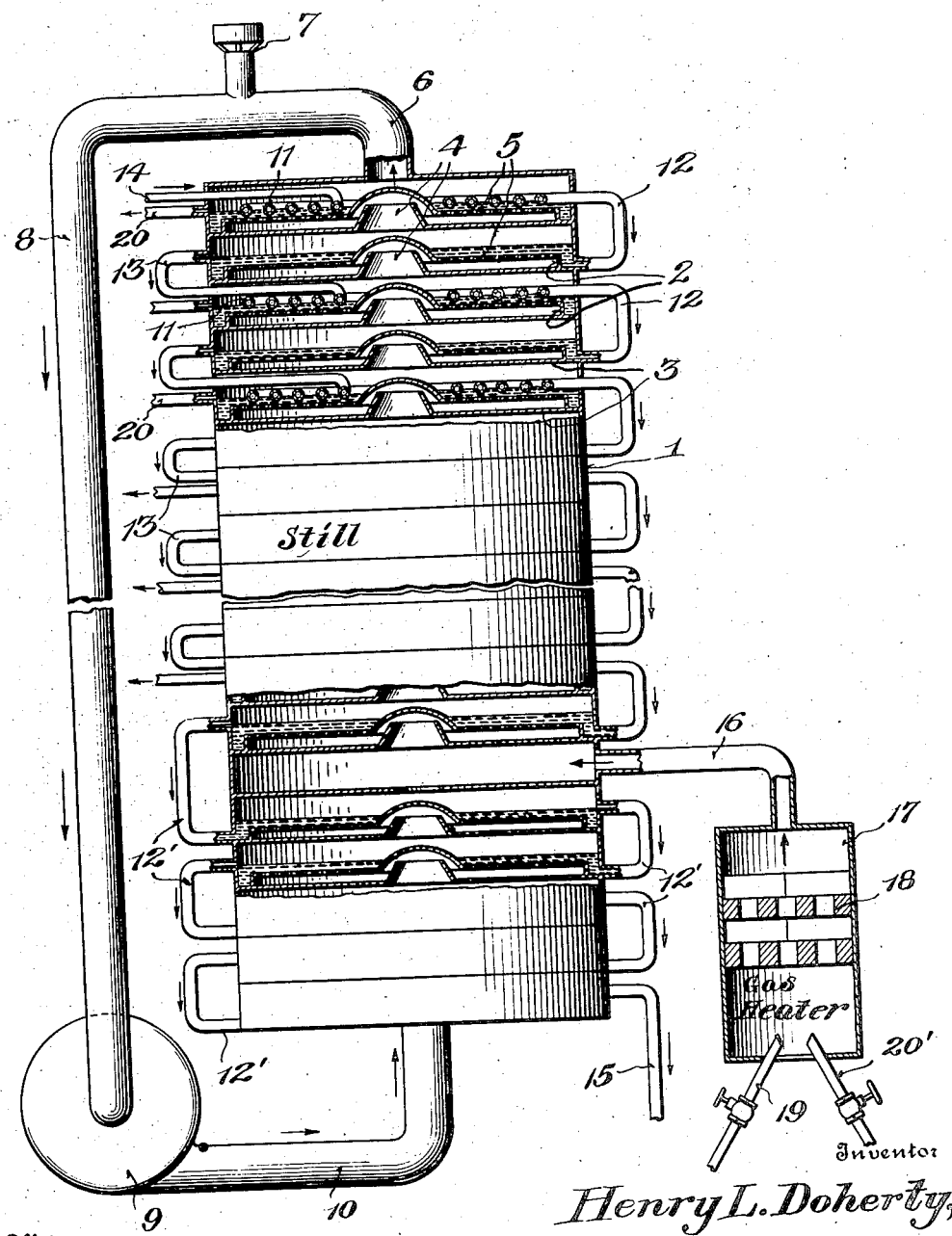

The structure of Figure 1 is, in a general way, like a column still. It advantageously may be much taller than the usual column still and is here shown as broken away in the middle. The taller it is and the greater number of sections contained in it the closer is the range of the several distillates or cuts obtained from it. The still consists of a tall vertical casing 1 which may be cylindrical but which, because of the ease of construction, is advantageously rectangular, long and narrow. The casing contains a number of separating partitions 2 of like construction. Each partition comprises a lower imperforate plate 3 completely spanning the casing and provided at its middle with an opening around which the metal is raised to form a frustum of a cone 4. Immediately above this plate is mounted a shorter uniformly perforated plate 5 spaced somewhat above the plate 3. At its middle each perforated plate is provided with an imperforate dome-shaped elevation corresponding to and covering the cone-shaped passage 4 of the immediate lower plate. Each partition is adapted to form a pool of liquid above it and the whole system furnishes a passageway from bottom to top of the apparatus for gases circulating in closed system through outlet 6 provided with venting outlet 7, through downtake 8, pump 9 and inlet 10 to the bottom of the still. This gas which is used as a heat carrier passes upward throughout the whole system of partitions going into the spaces between each imperforate plate and each perforate plate and rising through the perforations of the latter. The size of the perforations in the latter mentioned plates are such as to permit the passage of the gases but prevent the downward flow of the liquid through them to any substantial extent. Each alternate partition 2 or vaporizing unit is provided with a coiled pipe which delivers the liquid to the other alternating vapor units not so provided. The coil pipes are shown at 11 immersed in the body of liquid which is maintained above the perforated plates 5. The cold oil enters the uppermost coil 11 and after circulating through it is delivered to the next lower vaporizing unit by means of the bypass 12 and this liquid flows over the perforated plates 5 until it reaches the level of the bypass 13 which delivers it to the second coil pipe 11 in the next succeeding condensing unit. Cold oil enters the system through inlet 14 and after it has first become heated to some extent by the liquid in the uppermost condensing unit this heated oil descends to the next succeeding unit and then passes to the third succeeding unit in a coil and so on throughout the length of the still, the residual oil which has alternately been heated in coils and open form leaves the still through the residue delivering pipe or outlet 15 after having been stripped at different stages of its volatile constituents. The heat is supplied to approximately the middle of the still, and in order to accomplish this there is provided in addition to the gas flow system just described an inlet 16 for hot flue gases produced in stove or burner 17 containing the mixer checkerwork 18 and supplied with air through pipe 19 and with gas through pipe 20'. Each alternate partitioned space or unit serves as a condensing element producing a cut or fraction which is removed through outlet 20 intermediate units being vaporizing units. There may be a great number of these cuts or fractions obtained with a moderate size still. And the greater their number of course the closer is the boiling range of the fractions or cuts produced. The cold gas enters the bottom of the still and the hot flue gases enter at a higher point. The cold gases are progressively heated by the descending oil and arrive at the hottest portion of the still at the temperature there prevailing. They meet and mix with the hot gases at about the center of the still and the mixture passes through the cone shaped opening in the first partition which it meets and then spreads out between the two plates of such partition passing upwardly through the perforated partition to the next succeeding condensing unit, thus progressively heating the downcoming oil. This next succeeding unit may be the one containing the oil in the closed coil and that oil is heated by the gas and vapor, itself thereby condensing a portion of such vapors to form a liquid which is removed through outlet 20.

In the portion of the still below the hottest section substantially no vaporization takes place and there is no necessity in this portion of the still of providing condensing coils and outlets for condensed vapor. In this portion of the still the liquid space above each of the cross partitions communicates with that of the next succeeding by means of simple bypasses 12', so that the oil in each compartment goes directly to the next succeeding compartment below. In this lower portion of the still the function of the structure is simply to exchange heat between the downcoming oil and the upgoing gases. As conveyance of heat between a liquid and a gas can be made quite perfect the net result of the operation of this lower portion of the still is to return to the hottest portion of the still the heat leaving it with the downgoing oil.

Figure 2:
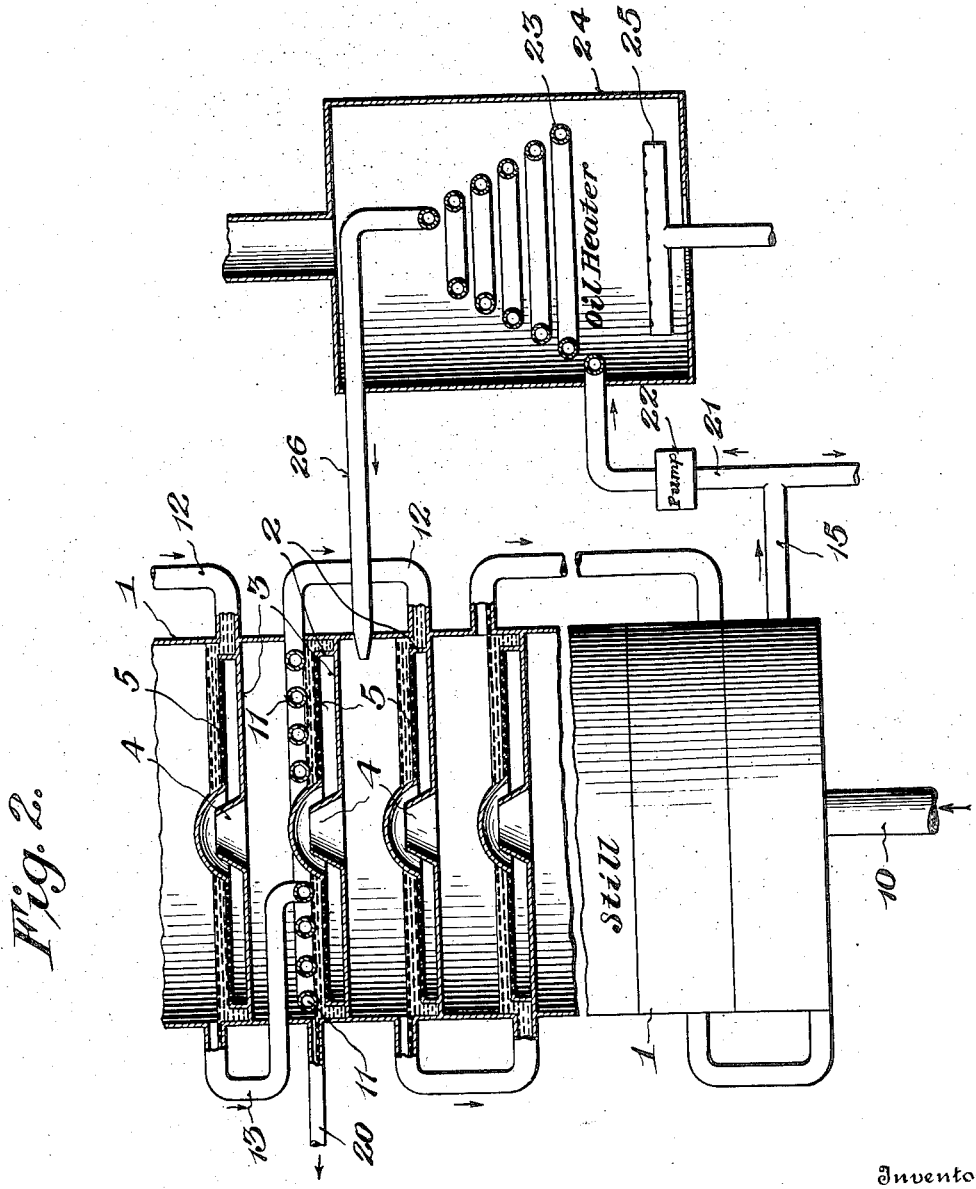
Fig. 2 is a fragmentary central vertical section, partly in elevation, of a similar type of apparatus illustrating the use of oil for heating in lieu of gas.

In Figure 2 I have shown an apparatus of a somewhat similar type to that shown in Figure 1 in which the carrier gas is not necessary, although it may be employed. The heat necessary for running the still is furnished by a special heating device. In this structure a portion of the residual oil leaving the base of the still at 15 is taken by a conduit 21 and pump 22 to and through a closed coil 23 in a heating casing 24. The oil in the coil may be heated by means of the gas burner 25 and the hot oil from the coil is sent by the pipe 26 back to the still at a suitable point. In this method of operation, a portion of the cold oil at the bottom of the still which has been stripped of its heat by the upward going gas from 10 is reheated and delivered to the hot point of the column.

In Figure 3 instead of using the oil to be distilled in its course through the still to cool and condense the vapors, the vapors from a next succeeding stage being cooled by the oil in the next preceding stage, oil from the base of the still is used as a heat absorbing agent. To this end a portion of the cold residual oil from the base of the still is taken by pipe 27 and pump 28 to the top of the still where it passes into coil 29. As in the other views, this coil is a condensing coil which condenses the vapors from the vaporizer next below and the oil in it is heated by these vapors to a slightly higher temperature. The oil which has served in the coil in the top section goes through bypass 30 to similar coils 31 in the next section but one below and so on down through the still until it joins the oil passing through the still at a point below the hottest zone. In this way the vapor entering each condensing unit is cooled independently of the oil being evaporated by the bodies of oil in the coils 29.

Oil to be distilled is introduced through pipe 30' into the first vaporizing unit. Here it yields vapors which are condensed in the condensing unit next above by the cold oil from the base of the still. Leaving this vaporizing unit through pipe 31' it bypasses the condensing unit next below and enters another vaporizing unit etc.; and so on down through the upper portion of the still until it enters the lower portion of the still where it is stripped of heat in the same manner as shown in Figure 1.

In Figure 4 is shown an assemblage comprising an element 32 a diagrammatically shown still of the character of those just described. As shown it is provided with the heating means of Figure 2, that is, means for introduction of heated residual oil at a point above the bottom of the still and it is provided with the gas circulation system of Figure 1. The oil which enters this still however, first goes through a stripping still indicated as a whole by 33. This stripping still may be of analogous construction to that shown in Figure 1. Cold crude oil enters it through inlet 34 and passes down through the still in the manner just described, fractions being collected at each alternate plate or condensing device. In lieu however of using a current of carrier gas in this still I use a current of steam introduced at 35. Any gases which may form in the still are vented at 36. Hot residual oil and the steam condensed in the stripping still pass out together through 37 whence they go to water separator 38. From this separator water goes to a source of disposal by 39 while the oil which is in a heated condition and has been stripped of its easily volatile components passes through 40 into the top of the main still 32. Through it it flows in the manner already described as regards Figure 1. Not all the crude oil is supplied to the steam stripping still as cold crude oil however for a portion of it may be supplied to the stripping still at a suitable point as heated crude oil through inlet 41. The use of this heated oil in the stripping still of course makes a saving in the amount of steam required therein; and I secure heat for this purpose by using the crude oil as a cooling agent in heat interchangers through which flow the cuts made in the main still, these heat interchangers being marked 42.

As shown, a suitable system of piping and valves 43 allows crude oil to be passed through any or all of these heat interchangers. In the heat interchanger the cuts or fractions made in the main still are cooled and discharged through outlets 44.

The structure of Figure 5 is analogous to that of Figure 1 in that heat is furnished by hot products of combustion; but the still is intended for use for cracking purposes and to be run under pressure. In so doing, it is frequently desirable to crack in the presence of special gases, such as methane, or gases made from oil, and these may be introduced into the system by inlet 45 on the suction side of the fan or blower sending gases through the system in cyclic circulation.

In Figure 6 I have shown a heating apparatus which is somewhat similar to that of Figure 2 in that it consists of the casing 24, coiled pipe 23 and burner 25. The still is provided with an imperforate partition 46 and the gases (and vapors) from below this partition may be withdrawn by means of pipe 47 and delivered to the coil from whence, after being heated, they may be delivered above the partition by means of the pipe 48, valve 49 being opened. In other words by means of this form of apparatus the hot gases may be abstracted from one portion of the still and heated and sent back to another portion of the still. When this is being done valve 50 on bypass 51 is closed or partially closed as the case may be. In normal operation the bulk of the gases may go through 51, valve 50 being open to a suitable extent while a smaller portion is bypassed through the heated system to receive heat. If the vapors are not to be re-heated at any particular time they may be all bypassed from below the imperforate partition 46 through 47, 51 and 48, valve 50 being then open and valve 49 being closed.

By the use of a gas as a heat-carrying medium, the oil distillation may be carried out in any of the stills described above, under atmospheric pressure at lower temperatures than the temperatures of distillation in the ordinary fire stills when operated at atmospheric pressure. The pressure in any one unit in the still is equal to the sum of the partial pressures of the various gas constituents in the unit. With the presence of oil vapors, oil gases, and a heat-carrying gas composed of various constituents, the partial pressure of the oil vapor permits an evaporation at much lower temperatures than if the heat-carrying gases were not present in the unit.

What I claim is:—

1. In the distillation of petroleum the process which comprises establishing and maintaining differential temperatures in a device like a column still, establishing and maintaining transverse bodies of oil across such device at different levels and at different temperatures, passing a feed of petroleum oil downward through such device, such oil flowing in heat transferring relationship to, but out of contact with alternate bodies and feeding to and being removed from intermediate bodies, and withdrawing liquid as distillate from such alternate bodies.

2. In the distillation of petroleum, the process which comprises establishing and maintaining a higher temperature in the middle portion of a device like a column still than obtains in portions below the above, establishing and maintaining transverse bodies of oil across such device at different levels and at different temperatures, passing the feed of petroleum oil downward through such device, such oil flowing in heat transferring relationship to, but out of contact with alternate bodies and feeding to and being removed from intermediate bodies, and withdrawing liquid as a distillate from such alternate bodies; a current of gases being kept flowing upwardly through said device to maintain the localized high temperature of the middle portion.

3. In the distillation of petroleum, the process which comprises establishing and maintaining a plurality of layers of oil in different heat zones of a still, passing oil in heat transferring relationship but out of contact with some of said layers to heat the oil of the layer and condense vapors in such layer and as free oil into other said layers, establishing vapor communication between the layers, and collecting the oil as distillate from the layers in which condensation has taken place due to the presence of the confined oil.

4. In the distillation of petroleum, the process which comprises establishing and maintaining a plurality of layers of oil in different progressive heat zones of a still, the different layers being in vapor communication, passing relatively cool oil in heat transferring relationship to but out of contact with the oil in some of said heat zones to heat the oil so passed and to condense the vapors in said heat zone, and delivering the so passed oil to another one of the layers in a different heat zone, and collecting the condensed vapors from the heat zones in which the relatively cool oil is passed.

5. In the distillation of petroleum the process which comprises establishing and maintaining a plurality of bodies of oil in different heat zones of the still, the bodies being in vapor communication, passing relatively cool oil in heat transferring relationship to but out of contact with the oil of said bodies to heat the oil so passed and to condense the vapors in said heat zones, delivering the so passed oil to another heat zone where portions of it may be vaporized, and conducting away the vapors condensed by means of said relatively cool oil.

6. In the distillation of petroleum the process which comprises establishing and maintaining a plurality of bodies of oil one above the other and in vapor communication with each other, passing relatively cool oil in closed circuit through alternate layers to be heated by the oil of such alternate layers, delivering the so heated oil to other alternate layers, and collecting condensed oil from the first set of alternate layers.

7. In the distillation of petroleum the process which comprises passing oil in closed circuit through a plurality of layers of progressively hotter oil to progressively heat the same, and passing said oil as an open body through alternate heat zones whereby said progressively heated oil may serve to progressively condense the vapors from oil of the alternate heat zones.

8. In the distillation of petroleum oils with production of close fractions, the process which comprises supplying such oil to alternate plates or partitions in a structure like a column still, the oil so supplied being bypassed around intermediate partitions or plates, suitably cooling such intermediate partitions or plates and withdrawing condensate thereby produced on such intermediate partitions or plates.

9. In the distillation of petroleum oils the process which comprises stripping such an oil of its more volatile components in a special still, supplying the stripped oil successively through a plurality of vaporizing units in a structure like a column still, cooling, condensing and withdrawing vapors produced in the vaporizing units by means of condensing units located intermediate such vaporizing units, passing the oil so treated through a plurality of stripping units below the point of maximum heat in the still and transmitting a current of gas in cyclic circulation through the still, such gas entering at the bottom and passing through the oil which is passing downward from the point of maximum temperature whereby the circulating gas carries the heat from the lower portion of the still back to the hottest point in such still.

10. A process of distilling oil comprising passing oil as a series of connected bodies downwardly through a still, conducting heated gas through some of the bodies of oil to vaporize volatile constituents and confining some of the bodies of said oil to heat-conducting relation to but out of contact with said heated gases and vapors to condense specific fractions of the vapors.

11. A process of distilling oils comprising passing oil as a series of connected bodies downwardly through a still, conducting heated gas countercurrent through said oil, controlling the heating of the gas to maintain the highest temperature at a mid portion of the still and confining some of the bodies of oil above said mid portion to heat-conducting relation to but out of contact with the heated gases to condense specific portions of oil vapors carried by said gases.

12. A process of distilling oil comprising passing oil as a series of connected bodies through a still, progressively increasing the temperature of the oil to drive off volatile vapors, condensing vapors of different boiling points in separate bodies of condensates maintained in heat-conducting relationship with some of said bodies of oil.

13. A process of distilling oil comprising passing oil as a series of connected bodies through a still, conducting a heated gas countercurrent through all said oil bodies to progressively give off heat as the gas rises through the oil and separating from the oil a series of fractional condensates as the oil advances, the boiling points of the fractions being progressively higher as the oil advances through the still.

14. A process of distilling oil comprising passing oil as a series of connected bodies downwardly through a still, conducting a heated gas countercurrent through all said oil bodies to progressively give off heat from the gas as it rises through the oil, separating from the oil a series of fractional condensates at different points in the passage of the oil, the boiling points of the fractions being progressively higher as the oil descends in the still, and maintaining each of said fractional condensates in heat-conducting relation to said oil and gas.

15. A process of distilling liquids having volatile constituents of varying boiling points comprising passing the liquid and a gaseous heating medium countercurrent through a still, controlling the supply of heat for said gas to maintain the highest temperature of the liquid at a point intermediate the ends of the countercurrent path of the liquid and gas, segregating from said heated liquid bodies fractional condensates of specific boiling points, and maintaining said condensates in heat-conducting relation with said gas and liquid.

16. A process of distilling crude oil comprising, stripping from the crude oil the lower boiling point fractions by partial pressure with steam, separating the stripped oil from condensed steam and passing the stripped oil in a continuous circuit through a still as a series of connected bodies, conducting a heated vaporizing gas countercurrent through said oil, and separating from the stripped oil a series of different fractional distillates.

17. A process of distilling oil comprising passing oil in a continuous circuit through a still stripping the lower boiling point fractions from the oil in one portion of the circuit with a heated gas condensable at atmospheric pressure, continuously distilling the stripped oil in another portion of the circuit with a heated gas non-condensable at atmospheric pressure and maintaining said condensable and non-condensable gases separate and independent of one another.

18. A process of distilling oil comprising passing oil in a continuous distillation circuit through a still, stripping the lower boiling point fractions from the oil with steam, and simultaneously fractionally distilling the stripped oil with a heated fixed gas maintained separately from said steam.

19. A process of distilling crude oil comprising passing oil in a continuous circuit through a still, progressively heating the oil as it advances through the still, separating a series of fractional distillates from said oil, preheating the crude oil with said distillates, stripping the crude oil of its lower boiling point fractions by distillation with steam, and introducing the stripped oil into said continuous circuit.

20. A process of distilling oil comprising advancing oil in a continuous circuit through a still, conducting a vaporizing gas countercurrent through said oil, removing a residuum oil from the end of the circuit, and pre-heating and returning said residuum to a mid portion of the circuit for preheating said gas.

21. A process of distilling oil comprising advancing oil in a continuous circuit through a still, conducting a vaporizing gas countercurrent through said oil, separating from said oil as it advances a series of fractional distillates, removing residuum oil from the end of the circuit, and heating and returning said residuum to a mid portion of the circuit to preheat said gas.

22. A process of distilling oil comprising passing oil as a series of connected bodies through a still, vaporizing the volatile constituents of the oil by heating under partial gas pressures formed by gas separately introduced into the oil, condensing vapors of different boiling points in bodies separated from the connected oil bodies, and maintaining said condensed fractions in heat-conducting relation with the oil as it is heated.

23. A process of fractionally distilling hydrocarbon oils comprising passing oil through a still as a series of bodies maintained at progressively higher temperatures, vaporizing oil in said bodies, and condensing said vapors as separate fractional bodies by a heat interchanging relation with oil in preceding cooler bodies.

24. A process of refining hydrocarbon oils comprising passing oil through a still as a series of bodies maintained at progressively higher temperatures, vaporizing oil in the said bodies, conducting the vapors as formed through bodies maintained at cooler temperatures, fractionally condensing vapors by heat interchanging relation with oil, in preceding cooler bodies, and separately collecting the fractional condensates.

In testimony whereof, I affix my signature hereto.

HENRY L. DOHERTY.

Witnesses:
 THOS. I. CARTER,
 WILLIAM C. DREYER.